UNITED STATES PATENT OFFICE.

OTTOKAR SERPEK, OF MADULEIN, SWITZERLAND.

METHOD OF PRODUCING AMMONIA.

No. 884,423.        Specification of Letters Patent.        Patented April 14, 1908.

Application filed May 24, 1907. Serial No. 375,451.

*To all whom it may concern:*

Be it known that I, OTTOKAR SERPEK, doctor of chemistry, a subject of the Emperor of Austria-Hungary, residing at Madulein, Switzerland, have invented new and useful Improvements in Methods of Producing Ammonia, of which the following is a specification.

My invention relates to a method of producing ammonia and consists in the process wherein the ammonia is obtained from aluminum nitrids.

As is known, a part of the nitrogen contained in aluminum nitrids is given off as ammonia by exposing the substance to the action of air. But only a very small amount of ammonia is obtained in this way. According to my invention, all the nitrogen contained in aluminum nitrids is easily and quickly given off as ammonia, if the aluminum nitrids are boiled with water at temperatures above 100° centigrade, *i. e.*, under pressure which can be obtained in an autoclave or other suitable vessel. My new method is thus especially adapted for producing large quantities of ammonia on a manufacturing scale. The reaction which takes place in my new process is $$2AlN + 3H_2O = Al_2O_3 + 2NH_3.$$

The temperature employed does not preferably exceed 200° centigrade, as otherwise the yield of ammonia is decreased.

The aluminium nitrids to be treated are preferably procured according to one of the following methods, which have all the one common point, namely: that the aluminum nitrids are obtained from aluminum carbid, which is employed as the initial material, or is formed itself in the course of the process. In one instance I powder aluminum carbid, heat it in a suitable heating apparatus to a good red heat, and conduct a current of nitrogen or of gas containing nitrogen, as, for example, air, over it. Thus under an increase of volume aluminum nitrid is formed. The nitrogen will be absorbed more readily and easily and in a greater quantity if carbon or alumina or aluminum chlorid or a mixture of any two of them or all of them is added to the aluminum carbid. The aluminum carbid will further be rendered more capable of absorbing the nitrogen by the addition of a metal or metals, such as copper, aluminum or iron, or of an alloy or alloys from metals or of a mixture of a metal or metals with the above mentioned materials.

In the cases given above, aluminum carbid, with or without admixtures is employed as initial material, and it is thus necessary for obtaining the aluminum nitrid rich in nitrogen to employ a high grade aluminum carbid, the costs of which are relatively high. Thus an important improvement consists in forming the aluminum carbid in the course of the process for producing aluminum nitrids. For this purpose, a powdered mixture of aluminum and carbon, with or without the admixtures stated above, is heated in an atmosphere containing nitrogen to the temperature necessary for the formation of aluminum carbid. This temperature is, however, maintained only for such a time that a partial formation of aluminum carbid would be possible. In this way from aluminum and carbon a mass is produced containing mostly aluminum nitrids, and only an insignificant amount of aluminum carbid, the further treatment of which may be dispensed with.

In all of the modes set forth of the methods for producing aluminum nitrids, an acid gas, as hydrochloric acid or sulfur dioxid is advantageously added to the nitrogen, whereby the formation of aluminum nitrids is facilitated.

A suitable mixture of aluminum carbid, alumina and carbon, is one which contains 20% of aluminum carbid. As an addition to the nitrogen, quite small quantities of hydrochloric acid or sulfurous acid are sufficient for instance: the nitrogen may have 0.1% of the acid gas. Aluminum chlorid is sufficiently present in an admixture of 1% and the metals above mentioned, such as copper, iron or the like in an admixture of 5%. These quantities, however, are given by way of example and not as exactly limiting the proportions.

I claim—

The method of producing ammonia which consists in boiling aluminum nitrid with water, at temperatures above 100° centigrade and below 200° centigrade under pressure, substantially as described.

In testimony whereof I have signed my name to this specification in the presence of two subscribing witnesses.

OTTOKAR SERPEK.

Witnesses:
A. LIEBERKNECHT,
EUGEN TROTE.